(12) United States Patent
Kientz et al.

(10) Patent No.: US 8,014,102 B2
(45) Date of Patent: Sep. 6, 2011

(54) DATA STORAGE TAPE FOR MINIMIZED DAMAGE

(75) Inventors: Steven M. Kientz, Westminster, CO (US); Mark L. Watson, Louisville, CO (US)

(73) Assignee: Oracle America, Inc., Redwood City, CA (US)

( * ) Notice: Subject to any disclaimer, the term of this patent is extended or adjusted under 35 U.S.C. 154(b) by 1043 days.

(21) Appl. No.: 11/845,881

(22) Filed: Aug. 28, 2007

(65) Prior Publication Data

US 2009/0059428 A1  Mar. 5, 2009

(51) Int. Cl.
*G11B 15/18* (2006.01)
*G11B 23/08* (2006.01)

(52) U.S. Cl. .......... 360/132; 360/134
(58) Field of Classification Search .......... 360/128, 360/132, 134
See application file for complete search history.

(56) References Cited

U.S. PATENT DOCUMENTS

| | | | | |
|---|---|---|---|---|
| 4,893,209 A * | 1/1990 | Siddiq | | 360/128 |
| 5,572,378 A * | 11/1996 | Schwarz et al. | | 360/48 |
| 6,154,342 A | 11/2000 | Vanderheyden et al. | | |
| 6,198,589 B1 * | 3/2001 | Oguro et al. | | 360/72.2 |
| 7,000,860 B1 | 2/2006 | Morgan et al. | | |
| 7,227,721 B1 | 6/2007 | Kientz et al. | | |
| 2008/0151425 A1 * | 6/2008 | Vanderheyden | | 360/132 |

* cited by examiner

*Primary Examiner* — Jefferson Evans
(74) *Attorney, Agent, or Firm* — Brooks Kushman P.C.

(57) ABSTRACT

A data storage device has a cartridge with tape having data and landing zones. One of the landing zones is aligned with a head during stopping of advancement of the tape to minimize damage. A data storage system is provided with a data storage device with data and landing zones, a read/write head, a motor for driving the tape and a processor for identifying the landing zone locations. A method for minimizing damage to data tape conveys base film along a coating head while intermittently dispensing a magnetic layer and a rougher coating layer to form landing zones. A method for minimizing damage to data storage tape provides a cassette with tape having intermittent data and non-data regions, that is inserted into a tape drive and a read or write function is performed. The tape is advanced to align a non-data region with a head and advancement is discontinued.

20 Claims, 4 Drawing Sheets

DATA STORAGE TAPE FOR MINIMIZED DAMAGE

BACKGROUND OF THE INVENTION

1. Field of the Invention

The invention relates to tape for data storage devices.

2. Background Art

Data storage devices such as data storage tape cartridges have been employed in the computer, audio, video, and related arts. Data storage tape devices are often employed for recording and storing large quantities of data for subsequent access and use.

Continual advancement of tape drive systems result in an increase of areal density of the tape drive systems in order to support higher capacity data cartridges. Increased areal data densities are provided by increasing the number of tracks per inch and/or by increasing the linear bit density. As the linear bit density recorded to the tape continues to increase, the location of the tape relative to a read/write head must be decreased in order to support the higher linear densities of the tape. For example, at linear densities of several hundred thousand bits per inch, the required head to tape spacing is on the order of tens of nanometers. To maintain this spacing, the tape and head surfaces must become smoother and more uniform than those used in lower capacity cartridges. Smooth tape has better recording properties that allows for higher recorded linear densities, but is more prone to stiction.

SUMMARY OF THE INVENTION

One embodiment of the present invention discloses a data storage device with a housing defining a cartridge sized to cooperate with a tape drive. A tape reel is mounted for rotation within the housing. A tape is mounted to the tape reel with a data zone for storing data and a landing zone to be aligned with a tape contacting component during stopping and starting of advancement of the tape to minimize damage to the data zone.

Another embodiment of the invention discloses a data storage system with a storage device having a housing defining a cartridge sized to cooperate with the tape drive, a tape reel mounted for rotation within the housing, and a tape mounted to the tape reel and having at least one data zone for storing data and a landing zone to be aligned with a tape contacting component during stopping and starting of advancement of the tape to minimize damage to the data zone. The system includes a tape drive sized to receive the storage device. At least one read or write head is oriented within the tape drive to read or write to the data tape. At least one motor is oriented in the tape drive for driving the reel to advance the data zone along the read or write head. A processor is in communication with the data storage device for identifying the landing zone. The processor is also in communication with the motor so that the motor only stops driving the tape reel when the landing zone is aligned with the read or write head to minimize damage when the tape is driven by the motor from a stop position.

Yet another embodiment of the invention discloses a method for minimizing damage to data tape by conveying a base film along a coating head. A smooth magnetic layer is intermittently dispensed upon the base film from the coating head. Another coating layer that is rougher than the smooth magnetic layer is intermittently dispensed upon the base film between sequential applications of the smooth magnetic layer to form landing zones for minimizing damage to data zones caused by stiction.

Another embodiment of the invention discloses a method for minimizing damage to data storage tapes by providing a cassette with tape having intermittent data and non-data regions. The cassette is inserted into a tape drive. A read or write function is performed to the data regions. The tape is advanced to align a non-data region with a read or write head of the tape drive. Advancement of the tape is discontinued so that upon subsequent advancement of the tape, a non-data region is aligned with the read or write head to avoid stiction to the data tape.

The above embodiments, and other embodiments, aspects, objects, features, advantages, and benefits of the present invention are readily apparent from the detailed description of embodiments of the present invention when taken in connection with the accompanying drawings.

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

As tape drive systems and tape cartridges evolve, tape drives require much higher areal data densities than previous tape drive systems. Since areal data densities are a function of kilobits per inch times tracks per inch, an increase in the kilobits per inch requires the read or write head to be located closer to the surface of the tape. In order for the tape to be closer to the head, smoother media and smoother heads must be employed. The difficulty with increasing the smoothness of the tape is that stiction is enhanced due to the contact of the smooth tape against the smooth head. Stiction can cause damage to the tape thereby requiring an adequately rough tape.

Tape stiction is the initial force required to overcome the static friction bond between the stationary tape and the head. Thus, tape stiction events are typically localized to start motions after the tape is stopped. Once the tape is in motion or streaming, stiction does not normally occur.

Figure 1:
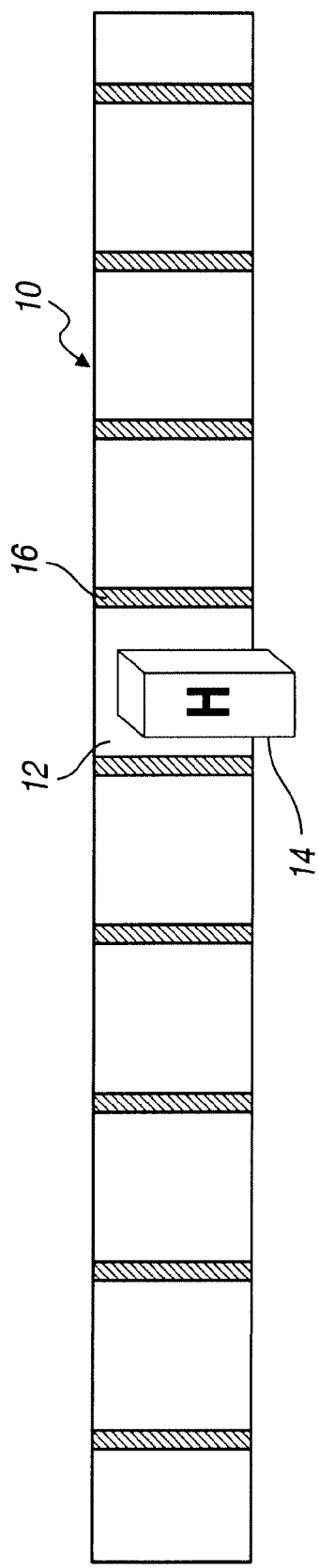
FIG. 1 is a schematic illustration of data tape in accordance with the present invention.

Referring now to FIG. 1, a tape is illustrated schematically in accordance with the present invention and is referenced generally by numeral 10. The tape 10 is illustrated removed from a corresponding data storage device and an associated tape reel or reels. The tape 10 includes a series of data zones 12 for storing data. The data zones 12 are extremely smooth, which allows a read/write head, illustrated schematically with reference numeral 14, to be in closer contact with the media and thereby allows an increase in linear density (kilobits per inch) which in turn increases the cartridge capacity.

In order to avoid stiction to the data zones 12, a series of landing zones 16 are provided on the tape 10 so that the tape 10 is only stopped when the landing zones 16 are aligned with a tape contacting component such as the head 14. The figure is not to scale; the landing zones 16 have a linear length along the tape to span a length of an external contacting component, such as the head 14. The landing zones 16 have a rougher surface than that of the data zones 12 to minimize the contact with the head 14 thereby minimizing static friction and stiction. Although one landing zone 16 could be utilized, it is common to reverse the direction and stop at intermediate locations along the tape 10 and therefore a series of landing zones 16 may be utilized as illustrated. The landing zones 16 are well defined regions along the length of the tape 10 with a higher surface roughness for minimizing the tape stiction when the landing zones 16 are stopped in contact with contact components such as the head 14. The rest of the tape 10 contains ultra smooth high density capable media at the data zones 12 which only contact the head 14 or other contact components during cruise or continual advancement of the tape 10.

The software of the associated tape drive system is programmed with information of the location of the landing zones 16 so that the motion of the tape 10 is only stopped when the landing zones 16 are aligned with contacting components, such as the head 14. To further assist with the stopping of the tape 10 on the landing zones 16, the landing zones 16 are spaced incrementally along the tape 10.

In one embodiment, the landing zones 16 are spaced every fifty meters and the landing zones 16 have a length of thirty centimeters. If the tape 10 has a total length of one thousand meters, only six meters of tape are dedicated to the landing zones 16, which is a loss of 0.6% capacity. Thus, the capacity loss and unused tape length are justified by the enhanced capacity of areal data density of the tape 10 that can be stored in an associated storage device. Eliminating stiction also limits the amount of time lost during stiction recovery techniques and improves overall throughput of the associated device.

One embodiment of the invention utilizes a tape 10 with data zones 12 provided by an advanced media coating. As is known in the art, the smoothness of the data zones 12 is provided by utilizing extremely fine, small coating particles and very few larger wear particles. Conversely, the rougher landing zones 16 are coated with conventional large coarse particles with a substantial distribution of wear particles which increase the surface roughness.

Figure 2:
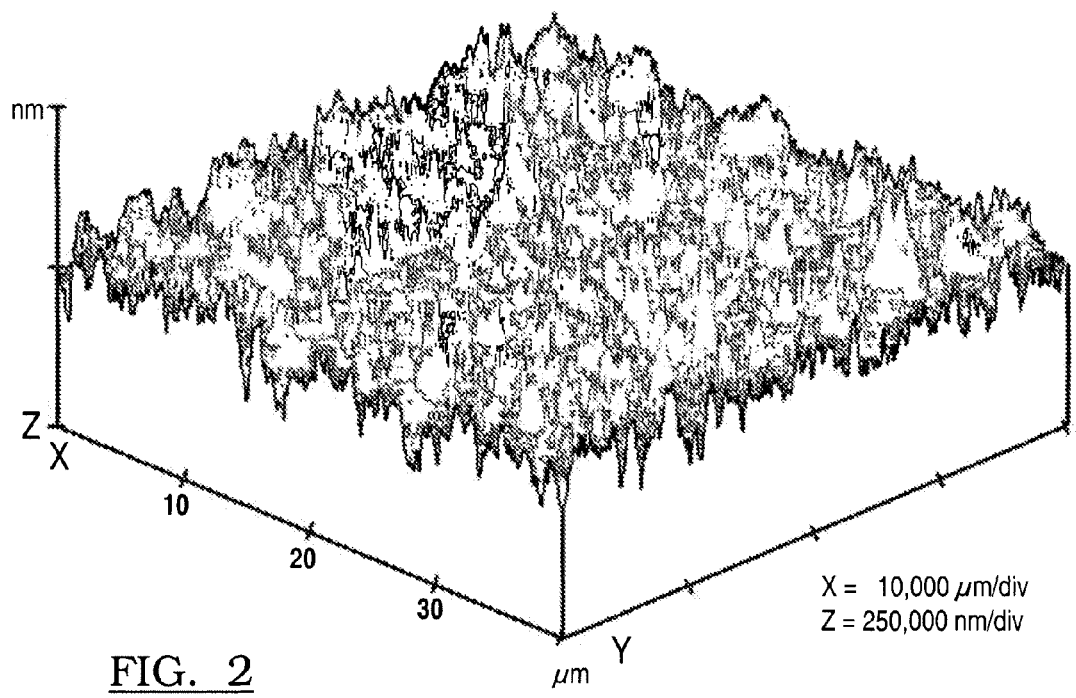
FIG. 2 is a surface profile of a region of the data tape.
Figure 3:
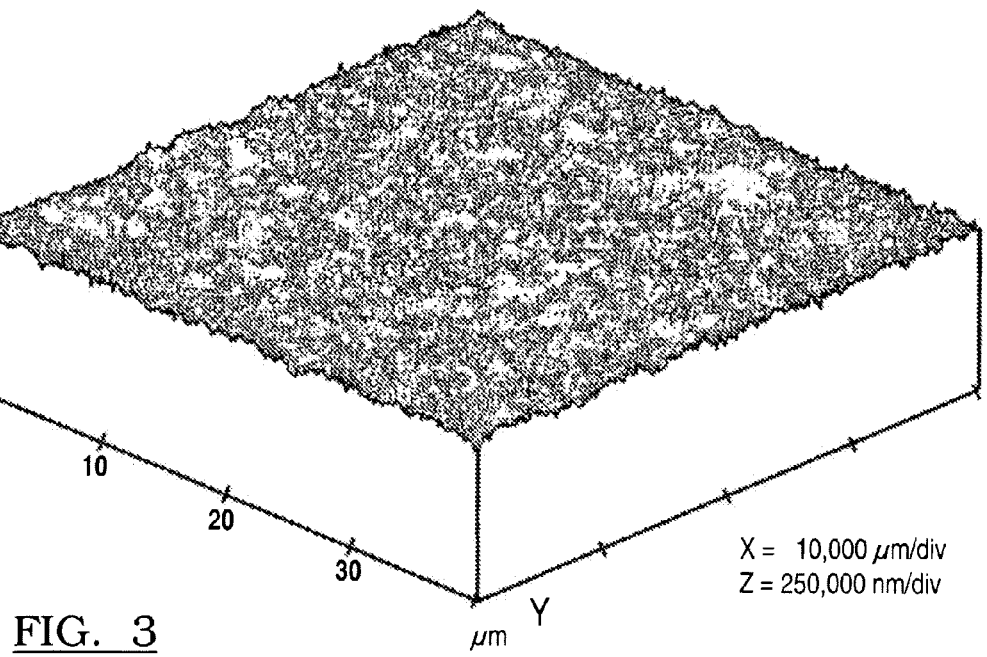
FIG. 3 is a surface profile of another region of the data tape of FIG. 1.

The surface profiles were measured by an atomic force microscope and are illustrated in FIG. 2 for a rough coating of the landing zones and FIG. 3 for a smooth coating of the data zones 12. The profiles are of coatings for one embodiment, and are not to be interpreted as limiting because the invention contemplates various rough and smooth coatings within the spirit and scope of the present invention. The profiles of FIGS. 2 and 3 illustrate the measured area in the X and Y axes with a height or surface profile in the Z axis. By comparing FIGS. 2 and 3, the rough landing zones 16 have much higher peaks thereby resulting in a greater surface roughness and a reduced tape stiction. Likewise, the smooth coating of the data zones 12 illustrated in FIG. 3 has much lower peaks thereby resulting in a smoother surface with an enhanced occurrence of tape stiction because of the larger surface area in contact with the head 14.

Figure 4:
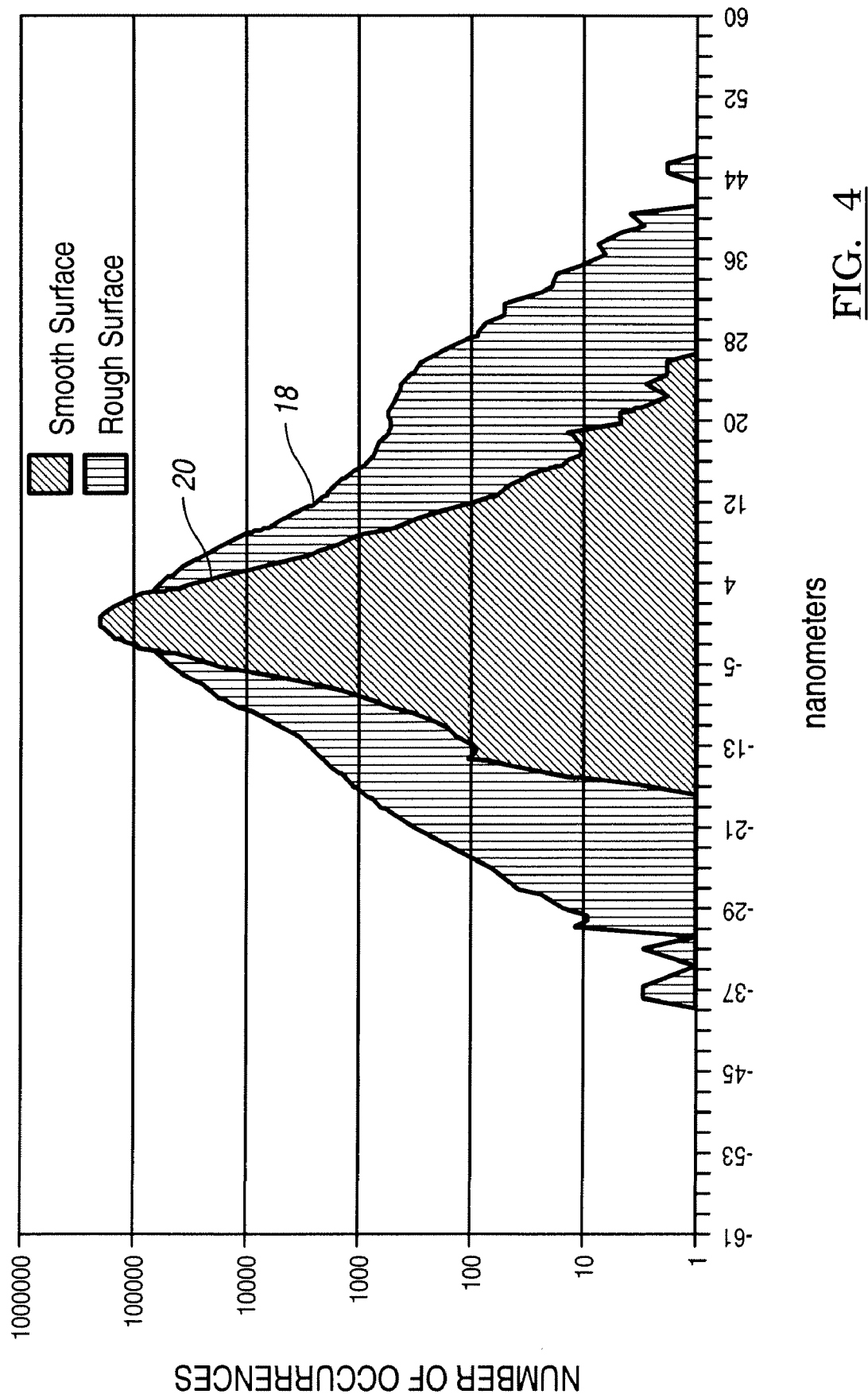
FIG. 4 is a surface histogram of the data tape regions of FIGS. 2 and 3.

FIG. 4 illustrates a surface histogram comparing the atomic force microscope measurements of the rough landing zone 16 surface measurements of FIG. 2 and the smooth data zone 12 surface measurements of FIG. 3. FIG. 4 illustrates a chart of the height of the peaks of each surface profile along the abscissa measured in nanometers. The number of occurrences of each peak are provided along the ordinate. The landing zone profile is referenced by numeral 18 and the data zone profile is referenced by numeral 20. The landing zone profile 18 ranges from forty-seven nanometers to negative thirty-eight nanometers with a large occurrence (less than 100,000 data points) at approximately negative one nanometer, which is a non-limiting example of an embodiment of the invention. The data zone profile 20 has a much tighter distribution with peaks ranging from twenty-eight nanometers to negative eighteen nanometers and a large occurrence (over 100,000) of peaks of negative one nanometer, which is also a non-limiting example for the illustrated embodiment. Thus, due to the tighter distribution and lessened height of peaks in the surface of the data zone profile 20, the data zones 12 are much smoother than the landing zones 16. Due to the enhanced roughness of the landing zones 16, the landing zones 16 are less susceptible to static friction and damage associated with overcoming static friction or stiction. As stated above, various rough and smooth coatings can be employed within the spirit and scope of the present invention.

Figure 5:
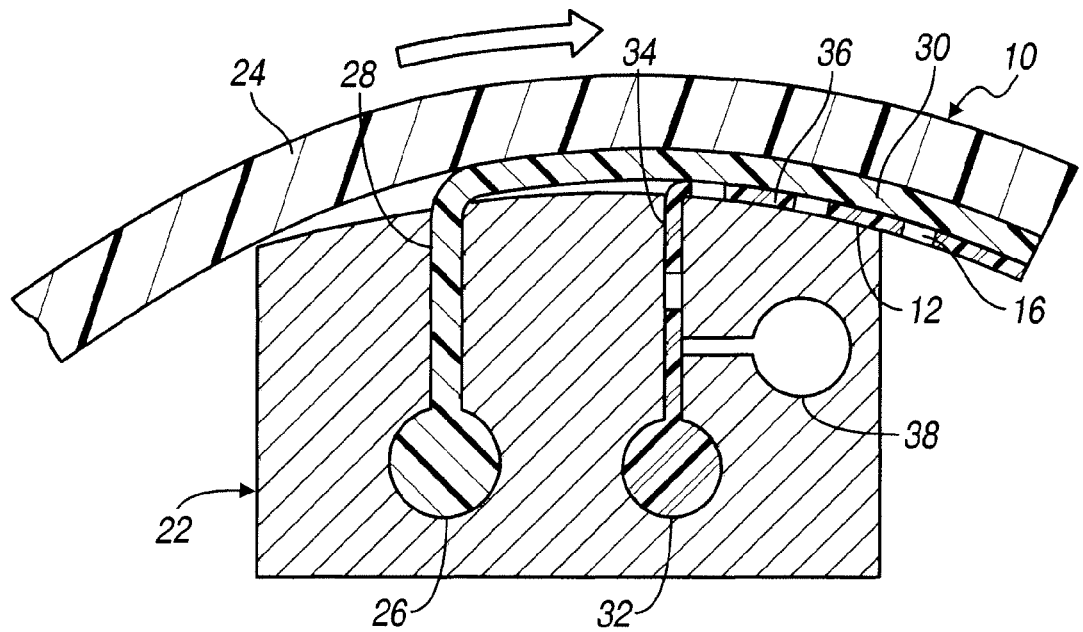
FIG. 5 is a schematic illustration of the data tape in cooperation with a coating head.

Referring now to FIG. 5, a coating head 22 is illustrated for fabricating the tape 10. The tape 10 includes a base film 24 that is conveyed across the coating head 22 as illustrated by the arcuate arrow. The base film 24 passes a first non-magnetic coating reservoir 26, which dispenses a non-magnetic coating from a port 28 of the coating head 22. The non-magnetic coating adheres to the base film 24 and provides a non-magnetic layer 30 upon the tape 10. The non-magnetic layer 30 serves to bond a smooth magnetic or rougher landing zone coating upon the structural base film 24 of the tape 10.

The coating head 22 also includes a magnetic coating reservoir 32 for dispensing a smooth magnetic coating through a port 34 of the tape head 22. As the tape 10, which includes the base film 24 and the non-magnetic layer 30 passes the port 34, a data zone magnetic layer 36 is adhered to the non-magnetic layer 30.

The coating head 22 also includes a landing zone coating reservoir 38 for retaining a rough landing zone coating. The landing zone coating reservoir 38 is in fluid communication with the port 34 to incrementally dispense landing zones 16 upon the tape 10 through the port 34. Of course, FIG. 5 is not to scale and the landing zones 16 are sized to contact all external contacts such as the read/write head 14 and any associated rollers. Likewise, the data zones 12 of the magnetic layer 36 are incrementally sized, e.g., fifty meters in length.

The landing zones 16 are formed of a rough magnetic coating with a low areal data density so that information can be stored to the landing zones 16. In at least one embodiment, information identifying the locations of the landing zones 16 is stored to an external storage device, such as an radio frequency identification (RFID) chip. Thus, the information can be read from the chip and communicated to an associated servo motor for conveying the tape to one of the landing zones 16 within the landing zone pattern.

Although a rough magnetic coating has been described as the landing zone coating, the invention contemplates that the landing zones 16 may be provided by a non-magnetic coating provided in the landing zone coating reservoir 38.

Figure 6:
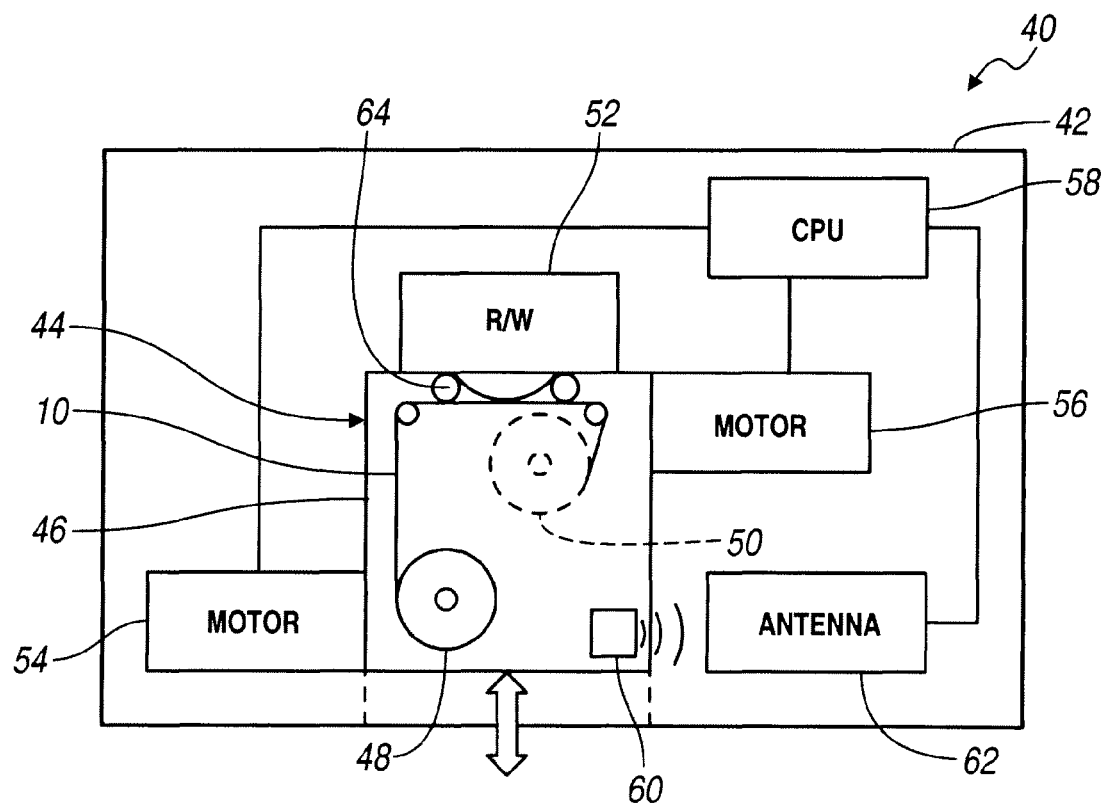
FIG. 6 is a schematic illustration of a data storage system in accordance with the present invention.

Referring now to FIG. 6, a data storage system 40 is illustrated schematically in accordance with the present invention.

The data storage system 40 includes a tape drive 42 sized to receive a data storage device 44. The data storage device 44 includes a cartridge 46 for housing a tape reel 48. The tape 10 is spooled about the tape reel 48. The data storage device 44 may have one tape reel as is known in the art, and is disclosed in U.S. Pat. No. 7,000,860 B1, which issued to Morgan et al. on Feb. 21, 2006, the disclosure of which is incorporated in its entirety by reference herein. In another embodiment, the data storage device 44 includes a second tape reel 50 and the tape 10 is mounted to both tape reels 48, 50. Dual tape reel storage devices are known in the art such as U.S. Pat. No. 6,154,342, which issued to Vanderheyden et al. on Nov. 28, 2000, the disclosure of which is incorporated in its entirety by reference herein.

The tape drive 42 includes a read/write head 52 for cooperating with the data zones 12 of the tape 10 for reading information from the tape 10, writing information to the tape 10, or reading and writing information to and from the tape 10.

The tape drive 42 includes a servo motor 54 for driving the tape reel 48 and consequently the tape 10 in one direction. Another servo motor 56 is provided for driving the second tape reel 50 and consequently the tape 10 in the other direction along the read/write head 52. The locations of the landing zones 16 are communicated to the servo processors of the servo motors 54, 56 such that the tape 10 is only stopped when one of the landing zones 16 is aligned with the read/write head 52. This identification of locations on the tape 10 is capable by servo motors 54, 56, which are commonly used to map existing defects with a tape. In at least one embodiment, the tape 10 is servo written with longitudinal position marks. The longitudinal position marks are written to the landing zones 16 which are read by the read/write head 52, or the longitudinal position marks are written to another identifier in communication with the tape drive 42 to communicate the location of the landing zones 16 to the servo processors of the servo motors 54, 56.

The servo motors 54, 56 are capable of conveying the tape 10 at speeds such as ten meters per second. At ten meters per second, with landing zones 16 spaced every fifty meters, a maximum of five additional seconds is required to advance the tape 10 to the nearest landing zone 16 before stopping. Servo motors 54, 56 are capable of stopping within a tolerance of 1.5 inches to thirty-five millimeters of the target location. By providing landing zones greater than the tolerance, such as one foot to 0.3 meters, the landing zones 16 can be stopped in alignment with the read/write head 52 with accuracy and repeatability.

The tape drive 42 includes a processor or central processing unit 58 for controlling the servo motors 54, 56 and for communicating the locations and the landing zones 16. In at least one embodiment, the location of the landing zones 16 is stored in a RFID tag 60. The landing zone location data is programmed to the RFID tag 60 during servo writing. The tape drive 42 is provided with an antenna 62 for receiving the location of the landing zones 16 from the RFID tag 60 and for conveying this information to the processor 58. Thus, various data storage devices 44 can be provided with various landing zone locations that are conveyed to the tape drive 42 via the associated RFID tag 60. Utilization of RFID tags with data storage devices is known in the art and is disclosed in U.S. Pat. No. 7,227,721, which issued to Kientz, et al. on Jun. 5, 2007, the disclosure of which is incorporated in its entirety by reference herein.

The cartridge 46 can be inserted into the tape drive 42 as illustrated by the linear arrow in FIG. 6. The processor 58 drives one of the servo motors 54, 56 to advance the tape 10 over the read/write head 52. As the tape 10 is advanced over the read/write head 52, the read/write head 52 performs a read or write function to the data zones 12 of the tape 10. If the direction of the tape 10 is to be reversed, or if advancement of the tape 10 is to be stopped, the tape 10 is advanced to the next landing zone 16 to engage the read/write head 52 or any other external contacts such as rollers 64. Once the landing zone 16 is aligned with the read/write head 52, the tape 10 is stopped and subsequent advancement may then be performed or the cartridge 46 may be ejected from the tape drive 42. By combining smooth data zones 12 and comparatively rough landing zones 16, damage associated with tape stiction is minimized and the capacity of the data storage device is greatly enhanced with an affordable loss, less than one percent, of data tape length.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A data storage device comprising:
   a housing defining a cartridge sized to cooperate with a tape drive;
   at least one tape reel mounted for rotation within the housing; and
   a tape mounted to the at least one tape reel, the tape having at least one data zone for storing data, and at least one landing zone to be aligned with a tape contacting component during stopping and starting of advancement of the tape to minimize damage to the at least one data zone caused by stiction, wherein the at least one landing zone has a surface roughness greater than that of the at least one data zone.

2. The data storage device of claim 1 wherein the at least one landing zone is further defined as a non-data zone.

3. The data storage device of claim 1 wherein the at least one landing zone has a length sized to engage all external contacts within the data storage device.

4. The data storage device of claim 1 wherein the at least one landing zone has a surface peak distribution that varies by thirty nanometers or less.

5. The data storage device of claim 1 wherein the at least one data zone has a surface peak distribution that varies by twenty-eight nanometers or less.

6. The data storage device of claim 1 wherein the tape further comprises:
   a base film;
   a magnetic layer bonded to the base film for providing the at least one data zone; and
   another layer bonded to the base film that is rougher than the magnetic layer for providing the at least one landing zone.

7. The data storage device of claim 6 wherein the tape further comprises a non-magnetic layer bonded to the base film and wherein the magnetic layer and the landing zone layer are bonded to the non-magnetic layer.

8. The data storage device of claim 6 wherein the another layer further comprises a second magnetic layer that is rougher than the first magnetic layer.

9. A data storage system comprising:
   at least one data storage device according to claim 1;
   a tape drive sized to receive the at least one data storage device;

a read or write head oriented within the tape drive to read or write to the data tape of the at least one data storage device;

a motor oriented in the tape drive for driving the at least one reel of the at least one data storage device, to advance the at least one data zone along the read or write head; and a processor in communication with the at least one data storage device for identification of the at least one landing zone, the processor being in communication with the motor such that the motor only stops driving the at least one tape reel when the at least one landing zone is aligned with the read or write head to minimize damage to the at least one data zone when the tape is driven by the motor from a stopped position.

10. The data storage system of claim 9 wherein the motor further comprises a servo motor.

11. The data storage system of claim 9 further comprising:
a radio frequency device with landing zone location information oriented within the at least one data storage device to identify a location of the at least one landing zone relative to the tape; and
an antenna in communication with the processor to receive the location of the at least one landing zone from the radio frequency identifier and to convey the location to the processor.

12. The data storage system of claim 9 wherein the at least one data storage device further comprises a plurality of data storage devices.

13. A data storage device comprising:
a housing defining a cartridge sized to cooperate with a tape drive;
at least one tape reel mounted for rotation within the housing;
a tape mounted to the at least one tape reel, the tape having at least one data zone for storing data, and at least one landing zone to be aligned with a tape contacting component during stopping and starting of advancement of the tape to minimize damage to the at least one data zone caused by stiction; and
a radio frequency device containing a location of the at least one landing zone for communicating with a tape drive to identify the location of the at least one landing zone relative to the tape.

14. The data storage device of claim 13 wherein the at least one data zone further comprises a series of data zones and the at least one landing zone further comprises a series of landing zones, each oriented between a sequential pair of data zones.

15. The data storage device of claim 14 wherein the landing zones are generally spaced incrementally along the tape.

16. The data storage device of claim 14 wherein a location of the landing zones are stored on a radio frequency identification chip.

17. A method for minimizing damage to data tape comprising:
conveying a base film along a coating head;
intermittently dispensing a magnetic layer upon the base film from the coating head as the base film passes the coating head; and
intermittently dispensing another coating layer upon the base film that is rougher than the magnetic layer between sequential applications of the magnetic layer from the coating head as the base film passes the coating head to form landing zones for minimizing damage to data zones caused by stiction.

18. The method of claim 17 further comprising dispensing a non-magnetic layer upon the base film before application of the magnetic layer and the landing zone layers from the coating head as the base film passes the coating head.

19. A method for minimizing damage to data storage tape comprising:
providing a cassette with data tape according to claim 17 having intermittent data regions in the magnetic layer and non-data regions in the landing zones;
inserting the cassette in a tape drive;
performing a read or write function to the data regions;
advancing the tape to align a non-data region with a read or write head of the tape drive; and
discontinuing advancement of the tape so that upon subsequent advancement of the tape, a non-data region is aligned with the read or write head to avoid stiction to the data tape and damage to the data regions of the tape.

20. A data storage device comprising:
a housing defining a cartridge sized to cooperate with a tape drive;
at least one tape reel mounted for rotation within the housing; and
a tape mounted to the at least one tape reel, the tape having at least one data zone for storing data, and at least one landing zone to be aligned with a tape contacting component during stopping and starting of advancement of the tape to minimize damage to the at least one data zone caused by stiction, wherein the at least one landing zone has a length sized to engage all external contacts within the data storage device.

* * * * *